Sept. 30, 1958 C. E. HURLBURT ET AL 2,853,795
COMPASS DIRECTION INDICATING SYSTEM
Filed June 30, 1955 2 Sheets-Sheet 1

INVENTORS
CHARLES E. HURLBURT
SHELDON M. WALDOW
BY Geo. G. Hyde
ATTORNEY

Sept. 30, 1958    C. E. HURLBURT ET AL    2,853,795
COMPASS DIRECTION INDICATING SYSTEM
Filed June 30, 1955    2 Sheets-Sheet 2

INVENTORS
CHARLES E. HURLBURT
SHELDON M. WALDOW
BY Geo. G. Hyde
ATTORNEY

United States Patent Office 2,853,795
Patented Sept. 30, 1958

2,853,795

COMPASS DIRECTION INDICATING SYSTEM

Charles E. Hurlburt, River Edge, and Sheldon M. Waldow, Fort Lee, N. J., assignors to Bendix Aviation Corporation, Teterboro, N. J., a corporation of Delaware Application June 30, 1955, Serial No. 519,094

7 Claims. (Cl. 33—222)

This invention relates to a compass direction indicating system, and especially to a remote indicator system especially adapted for aerial navigation. It is of the type in which the direction indication may be derived either from a magnetic compass alone, from a directional gyro alone, or from a combination of these two devices.

In systems of this type a considerable amount of apparatus is required, including arrangements for correcting drift by the directional gyro to maintain a minimum of deviation, so that the total weight and bulk of such a system are substantial; and reduction of the weight and size of aircraft instruments is of prime importance from both the operational and the commercial standpoint.

An object of the invention is to provide a practical effective direction indicating system of the indicated type that may be made substantially smaller and lighter than previous system of said type. Another object is to devise such a system which provides the same operation with fewer parts, and thus not only facilitates the reduction in size and weight, but also improves operation by reducing the number of parts that require adjustment and maintenance, and which might introduce operational errors. A related object is to simplify the construction and operation of such systems, and to reduce the cost.

In systems which include a directional gyro, it is necessary to provide an arrangement to compensate for drift in azimuth to which such gyros are subject; and in order to obtain the necessary accurate compensation, a constant speed device, generally driven by a motor, is required as a stable time reference or source of uniform compensation. Another motor is required to make the necessary compensating adjustments. An object of the invention is to simplify this arrangement while retaining the functions described. A more specific purpose is to provide a simplified arrangement in which one motor performs the functions of the two motors previously used.

In systems of this type the direction signals from the gyro are generally transmitted through a synchro having a rotor operated from the gyro and a stator having polyphase windings. This stator is connected back to back to a similar stator of a remote receiver synchro whose rotor is connected to the direction indicator and is maintained in oriented relation to the transmitter synchro rotor by a motor through a suitable circuit. It is necessary to introduce into this arrangement corrections for gyro drift; and various constructions for this purpose, some of them rather complicated, are known.

An object of the invention is to provide a novel and improved arrangement for introducing such corrections; and a specific object is to apply such corrections to the receiver synchro itself. This is in general accomplished by rotating the receiver synchro stator relative to the rotor. An object therefore is to provide a system which includes means for actuating the direction indicator in accordance with the position of the directional gyro synchro receiver rotor, and means for changing the angular position of the stator of the latter synchro to compensate for drift of the directional gyro.

There are several factors which cause gyro drift, including the speed of the plane and the effect of latitude. In order to obtain improved accuracy in the indications of azimuthal direction derived from a directional gyro, it is desirable to introduce the proper corrections manually in accordance with variations in conditions, such as changes in latitude. An object, therefore, is to provide improved and convenient manually operable means for adjusting the rate of rotation of the above indicated receiver synchro to compensate for changes in drift caused by latitude changes, and for separately adjusting said rate to compensate for changes in drift from other causes, such as changes in speed.

In deriving azimuth direction indications from a directional gyro, the orientation of the gyro spin axis in azimuth is unimportant; but it is necessary to set the direction indicator initially to the proper position for accurate direction indication. An object of the invention is to provide, in combination with said drift compensating arrangements for controlling the indicator position, means for manually placing the indicator in any desired position without interfering with the setting or operation of the compensating arrangements.

The foregoing and other objects and advantages of the invention will appear more fully from consideration of the detailed description which follows, in connection with the accompanying drawings, wherein two embodiments of the invention are illustrated. It is to be expressly understood, however, that the drawings are for the purposes of illustration and description, and are not to be construed as defining the limits of the invention.

Figure 1:
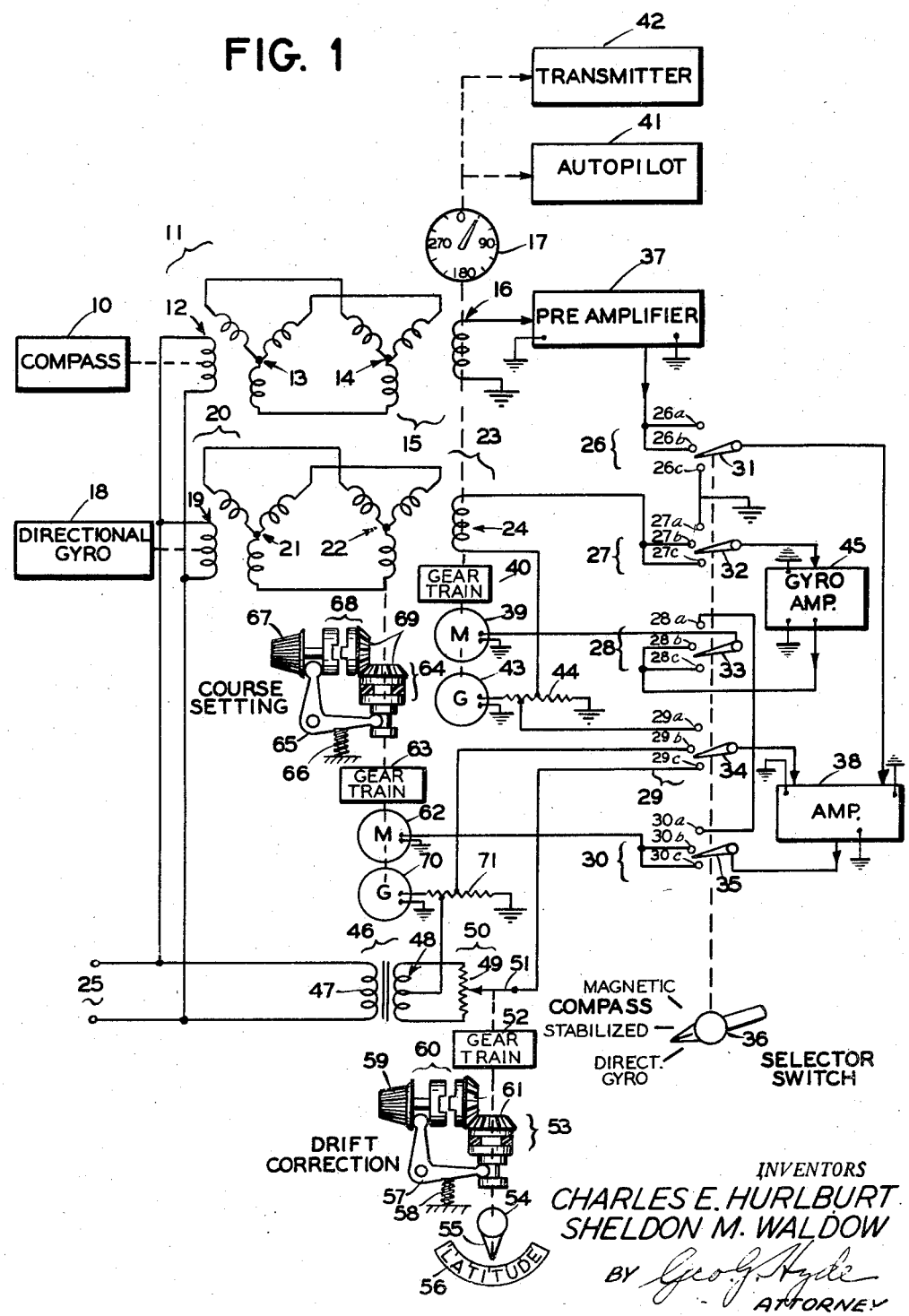
Fig. 1 is a schematic diagram of an embodiment of the invention.

The system as illustrated includes a magnetic compass 10, which advantageously is of the "Flux Gate" type, arranged for remote indication of direction, a compass of this type being shown in Patent No. 2,308,566, Noxon, January 19, 1943. The compass actuates a synchro transmitter 11 whose rotor 12 is rotated by compass 10 in accordance with changes in direction, and whose stator 13, shown as of the three circuit Y type, is connected back to back to the similar stator 14 of the remote synchro receiver 15, whose rotor 16 has a driving connection with the direction indicating dial 17.

The system also includes a directional gyro 18 having a drive connection to the rotor 19 of synchro transmitter 20, whose three circuit Y connected stator 21 is connected back to back to a similar stator 22 of the remote synchro receiver 23, whose rotor 24 likewise has a driving connection with dial 17. The transmitter rotors 12 and 19 are energized from a source 25 of alternating current.

A circuit arrangement is provided for rotating the receiver rotors 16 and 24 to maintain dial 17 in position for accurate direction indication. As already set forth, the circuit arrangement is designed to permit control of the dial either from the compass 10 alone, from the directional gyro 18 alone, or from the directional gyro 18 as corrected or stabilized by the compass 10. For this purpose a series of three-point switches 26, 27, 28, 29 and 30 is provided, having contact arms 31, 32, 33, 34 and 35 ganged together and operated by a single switch handle 36.

The switches are connected so that when the switch arms are in contact with the uppermost switch points, designated by the letter "a," the system will be operated by the magnetic compass 10. In this position the compass receiver rotor 16, grounded at one end, is connected at the other end through preamplifier 37, contact point 26a and switch arm 31 to amplifier 38, and thence through switch arm 35 and switch point 30a, switch point 28a and switch arm 33 to dial motor 39. Said motor has a driving connection through a gear train 40 to the receiver synchro rotors 24 and 16 and dial 17. It likewise drives signal transmitting apparatus of well known type forming part of the autopilot system 41, and a transmitter 42 which may be utilized to transmit signals corresponding to the position of dial 17 to remote instruments, such as remote direction indicators.

The motor 39 is advantageously provided with an arrangement for maintaining it at the proper speed. In the present embodiment a system is employed which includes a generator 43 driven from the shaft of motor 39 and having an output passing through potentiometer resistance 44 to ground. A point on resistance 44 having appropriate voltage is connected through switch point 29a and arm 34 to the input of amplifier 38, so that said voltage is applied to motor 39 in a sense appropriate to regulate the motor speed, operating to reduce the speed if the motor tends to rotate above the desired speed, and to increase the rate of rotation if the motor speed drops.

It will be apparent that with this arrangement the dial 17 is actuated solely by the compass 10. The switch arms 31—35 are placed in contact with the "a" switch points by shifting handle 36 to upper position, marked "Magnetic Compass."

For operation by the directional gyro 18 alone, the switch arms are placed by switch handle 36 in lowermost position in contact with the "c" switch points. In this position switch 26 is disconnected from the circuit of compass 10, which therefore is ineffective. The gyro receiver rotor 24 is connected at one end through switch point 27c and arm 32 to the gyro amplifier 45, whose output is transmitted through switch point 28c and arm 33 to dial motor 39. The opposite end of rotor 24 is connected to the potentiometer resistance 44 at an appropriate voltage point. With this arrangement it will be evident that the position of dial 17 will be determined solely by the directional gyro 18.

An arrangement is provided for compensating the inevitable drift of gyro 18. For this purpose a transformer 46 has a primary 47 connected to source 25 and a secondary 48 across which the resistance 49 of a potentiometer 50 is shunted. The sliding arm 51 of said potentiometer is connected through switch point 29c and switch arm 34 to the input of amplifier 38. Potentiometer arm 51 is shifted through gear train 52 and clutch 53 by manually operated knob 54, which is conveniently provided with a pointer 55 traveling along a scale 56 marked to indicate latitude.

An arrangement is also advantageously provided to actuate potentiometer arm 51 without disturbing the latitude setting, the mechanism diagrammatically indicated including a bell crank 57 slidably engaging clutch 53 and actuated against compression spring 58 by knob 59 to disengage clutch 53, the knob simultaneously engaging clutch 60 connected to beveled gears 61 which are in the drive connection to potentiometer arm 51. With this arrangement, by pushing knob 59 inwardly and rotating it, the potentiometer may be set at any value without disturbing the setting of pointer 55, thereby applying an appropriate voltage in the proper sense to the input of amplifier 38. The latter is connected through switch arm 35 and point 30c to the compensating motor 62, which is connected through a gear train 63 and clutch 64 to the stator 22 of the gyro receiver 23, said stator being mounted for rotation in known manner.

An arrangement may likewise be provided for setting the rotor 22 in appropriate position to locate dial 17 properly, in the manner hereafter described. For this purpose a similar clutch and knob arrangement is diagrammatically indicated, including a bell crank 65 opening clutch 64 against spring 66 when knob 67 is pressed in to engage clutch 68, so that rotation of knob 69 will then rotate stator 22 through bevel gears 69. This arrangement can also be used for manual reset of the direction indication when required.

An arrangement is provided for maintaining motor 62 at uniform speed, an important factor because such uniformity is necessary in order to obtain uniform drift correction. The arrangement disclosed is similar to that described for motor 39, including a generator 70 having a shaft driven by the shaft of motor 62 and an output connected through potentiometer resistance 71 to ground. An appropriate voltage point on resistance 71 is connected to the midpoint of transformer secondary 48, so that voltages from generator 70 will pass through the potentiometer arm 51 and amplifier 38 to motor 62 in the circuit already described, exerting the required stabilizing effect on the motor speed.

It will be evident that with the selective switch 36 in the lowermost position marked "Directional Gyro," with the switch arms on the "c" contacts, the dial 17 will be positioned solely by the directional gyro 18, and the steady drift of the latter will be automatically corrected in accordance with the setting of potentiometer 50.

With the switches in intermediate position, with the arms on the "b" contacts, the dial 17 will be positioned by the directional gyro 18, but its position will be continuously checked, and corrected when necessary, by the magnetic compass 10. When the circuit is thus connected, the compass receiver rotor 16 is connected through preamplifier 37, switch point 26b and switch arm 31 to the amplifier 38, whose output goes through switch arm 35 and switch point 30b to compensating motor 62. The gyro receiver rotor 24 is connected through switch point 27b and switch arm 32 to gyro amplifier 45, whose output goes through switch point 28b and switch arm 33 to the dial motor 39. In this position a point of suitable potential on potentiometer resistor 71 is connected through switch point 29b and switch arm 34 to the input of amplifier 38, thereby obtaining the speed stabilizing effect of the generator 70 on motor 62. In this circuit arrangement the corrections obtained from potentiometer 50 are not used, since the output of gyro 18 is regulated from the compass 10 in the manner hereafter set forth in describing the operation of the system.

Figure 2:
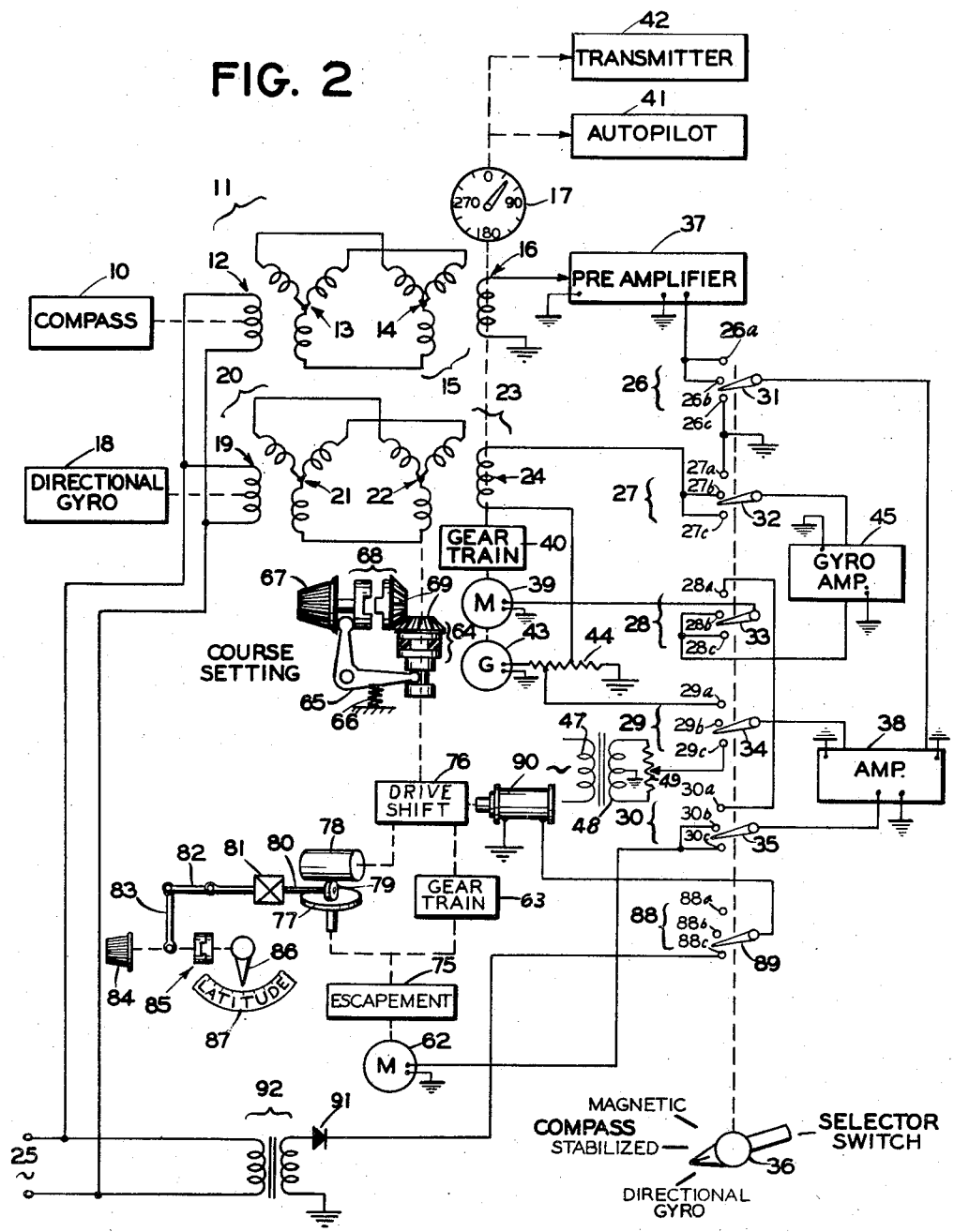
Fig. 2 is a similar diagram showing a modified form.

A modified arrangement is shown in Fig. 2. Most of the circuit elements included in this figure are identical with those of Fig. 1, and bear the same identifying numerals. The principal difference is in the arrangement for actuating the compensating system which positions the gyro receiver stator 22. In this arrangement two modes of rotating the latter stator are provided. The potentiometer 50 and its connections are omitted, and a different construction for introducing corrections for latitude and other drift is provided.

An arrangement for maintaining motor 62 at a constant speed is utilized; and while the arrangement involving the generator 70 will serve this purpose, as in Fig. 1, an alternative form is illustrated in Fig. 2, comprising a mechanical escapement 75 of any of the well known types. The drive from the escapement 75 is arranged so that it will normally drive the stator 22 through gears 63, drive shift 76 and clutch 64 when the system is operating under control of the stabilized directional gyro 18 with the switches on the "b" points.

However, upon the switches being on the "c" points the drive from escapement 75 is effectively connected to a mechanical compensating system which includes a drive disk 77 and a drive cylinder 78 positioned with its surface parallel to disk 77 and its axis intersecting the axis of said disk. A roller 79 mounted on shaft 80 slidable in bearing 81 is positioned in frictional engagement with disk 77 and cylinder 78, and is removable axially along cylinder 78 and the diameter of disk 77. With this known type of drive, the rate of rotation of cylinder 78 will vary from zero, when roller 79 is at the axis of disk 77, to a maximum when the roller is at the margin of said disk. Cylinder 78 has a driving connection through drive shaft 76 with clutch 64 and stator 22, said connection through the shift 76 being normally open except upon energization of a control solenoid 90 which operates gear shift 76 so as to effect a driving connection therethrough upon the selector switches being on the "c" points.

An arrangement is provided for positioning roller 79 in accordance with the desired rate of rotation of stator 22 to correct the drift of directional gyro 18. A mechanical system for this purpose is diagrammatically shown, comprising a link 82 connecting shaft 80 with rocking lever 83, actuated by knob 84 connected through clutch 85 to pointer 86 registering with latitude scale 87. The arrangement is such that by turning knob 84 with clutch 85 engaged, roller 79 is positioned at a point determined by the reading of pointer 86 on scale 87 to provide the proper rate and direction of rotation of stator 22 to compensate for the drift of gyro 18 due to the effect of the latitude shown on the scale 87 at which the aircraft is located. By shifting knob 84 axially and thereby disconnecting clutch 85, roller 79 may be manually shifted to compensate for another fixed drift factor, such as the speed of the aircraft, without affecting the latitude setting of pointer 86.

When it is desired to operate on the directional gyro 18 alone, and selector handle 36 is located to place the switch arms on the "c" contacts, contact 30c will connect the output of amplifier 38 to motor 62, as in Fig. 1. A supplementary switch 88, operated by switch handle 36 and having three similar positions, is located with its switch arm 89 in contact with the lowermost contact 88c. Arm 89 is connected to solenoid 90, which operates drive shift 76, and is energized from a suitable source connected to switch point 88c. In the form illustrated, point 88c is connected through a rectifier 91 to the output of a transformer 92 connected across the current source 25.

The operation of the embodiment shown in Fig. 1 is as follows: When selector switch 36 is in uppermost position, the compass receiver rotor 16 is connected to motor 39, which positions dial 17. When the aircraft is not turning, the synchro transmitter 11 and synchro receiver 15 will be in register, and no voltage will be generated across rotor 16. However, upon a change of heading and consequent rotation of the transmitter rotor 12, a corresponding signal from receiver rotor 16 will be applied to motor 39, which will rotate rotor 16 and dial 17 until the former is in null position and the latter indicates the new heading or change of heading. When motor 39 is in operation, generator 43 will maintain the motor at uniform speed in the manner already described. In this position the indicator is therefore operated by the magnetic compass alone.

When selector switch 36 is in lowermost position for operation on the directional gyro 18 alone, and the aircraft is not turning, receiver 23 will be in null position with relation to transmitter 20, and no signal will be generated. However, upon a new heading or change of heading of the aircraft and consequent relative movement of transmitter rotor 19 and stator 21, the signal generated in receiver rotor 24 will be applied through gyro amplifier 45 to motor 39, which will turn the gyro receiver rotor 24 to null position and simultaneously rotate dial 17 to indicate the new heading or change of heading.

In this switch position, operating on the gyro alone, automatic correction of gyro drift is necessary in order to reduce to a minimum the gyro error. For this purpose the operator may press and turn knob 59 to adjust potentiometer 50 for a fixed drift, such as that due to the speed of the aircraft, and may rotate knob 54 without pressing in the knob 59 in order to set the potentiometer 50 correctly for latitude drift. These settings will move the potentiometer arm 51 to a potential point that will operate motor 62 at a rate which, when very greatly reduced by the long gear train 63, will rotate the gyro receiver stator 22 at the proper rate to correct for the effects of such drift.

With this arrangement the rotation of gyro transmitter rotor 19 due to drift, which normally would produce a signal in the synchro receiver 24, will be compensated by the rotation of receiver stator 22; so that if the drift correction is perfect, receiver rotor 24 will remain in null position as long as the aircraft is not turning, regardless of the drift of directional gyro 18. If by position checks it is found that this drift rate is not entirely correct, a suitable rate correction may be manually introduced by operating the knob 59.

When the selector switch handle 36 is in intermediate position, with the directional gyro 18 stabilized by compass 10, and the aircraft is not turning, no signal will be generated in compass receiver rotor 16. However, if the drift of gyro 18 and consequent movement of gyro transmitter rotor 19 should develop a signal in the gyro receiver rotor 24, even though the aircraft is not turning, and the resultant signal from rotor 24 applied to motor 39 moves rotor 24 to null position, this action will also move the compass receiver rotor 16 out of null position and generate a signal which will be applied through the preamplifier 37 and amplifier 38 to motor 62, thereby rotating the gyro receiver stator 22 which will apply reverse voltage through the receiver rotor 24 to motor 39, turning rotor 24 in the other direction until it is in null position when the compass receiver rotor 16 is likewise in null position. In this manner compass 10 replaces the potentiometer 50 in regulating the rotation of stator 22 of the directional gyro receiver 15 in order to maintain continuously the correct null position for the receiver rotor 24 when the aircraft is on course.

The operation of the embodiment shown in Fig. 2 is the same as that of Fig. 1, except for the arrangement for rotating the gyro receiver stator 22. When the switches are in uppermost position, operating on compass 10 alone, motor 62 is not energized. In intermediate position it actuates the gyro receiver stator 22 at a fixed rate, maintained by escapement 75, through the long gear train 63, when the motor 62 is energized by signals from the compass receiver rotor 16. When operating on the gyro 18 alone with the switches in lowermost position, drive shift 76 is actuated by solenoid 90 to transfer the drive from the gear train 63 to the disk-and-cylinder compensating mechanism, whose operation has already been set forth.

Although only two embodiments of the invention have been illustrated and described in detail, it is to be expressly understood that the invention is not limited thereto. Various changes can be made in the design and arrangement of the parts without departing from the spirit and scope of the invention as the same will now be understood by those skilled in the art.

We claim:

1. The combination comprising a magnetic compass, a compass circuit transmitting directional signals corresponding to the compass position, a directional gyro, a gyro circuit transmitting directional signals corresponding to the gyro position, including a synchro having a rotor and a stator, and motor means for adjusting the rotor position in conformity with changes in direction indicated by the gyro, gyro drift compensating means, signal transmitting apparatus operatively controlled by the motor means responsive to the gyro circuit signals, means actuated by the compass circuit signals for correcting errors in the gyro circuit signals by rotational adjustment of the stator, and a manually operable switch including means for placing the drift compensating means in operation in one switch position, and other means for placing the error correcting means in operation in another switch position.

2. A direction indicating system comprising, in combination, a magnetic compass, a compass circuit transmitting directional signals corresponding to the compass position, a directional gyro, a gyro circuit transmitting directional signals corresponding to the gyro position, gyro drift compensating means including a variable speed drive and a drive motor therefor, direction indicating means, motor means responsive to the gyro circuit signals for positioning said indicating means, means actuated by the compass circuit signals for correcting errors in the gyro circuit signals, includng a drive connection to said first mentioned motor, and switch means for placing the drift compensating means, including said variable speed drive, in operation in one switch position, and placing the error correcting means, including said drive connection, in operation in another switch position.

3. A direction indicating system comprising, in combination, a magnetic compass, a compass circuit transmitting directional signals corresponding to the compass position, first adjustable means to null said compass directional signals, a directional gyro, a gyro circuit transmitting directional signals corresponding to the gyro position, second adjustable means to null said gyro directional signals, direction indicating means, motor means responsive to the gyro circuit signals for positioning said indicating means and said first and second adjustable means, means for correcting errors in the gyro circuit signals, another motor means for positioning said error correcting means at a variable speed, a circuit for controlling energization of said other motor means in response to the compass circuit signals, another circuit for controlling energization of said other motor means including a gyro drift compensating control means for said other circuit, and switch means including means for placing said first mentioned control circuit in controlling operation in one switch position and other means for placing said other control circuit including said gyro drift compensating means in controlling operation in another switch position.

4. A direction indicating system comprising, in combination, a magnetic compass, a compass circuit transmitting directional signals corresponding to the compass position, first adjustable means to null said compass directional signals, a directional gyro, a gyro circuit transmitting directional signals corresponding to the gyro position, second adjustable means to null said gyro directional signals, direction indicating means, motor means responsive to the gyro circuit signals for positioning said indicating means and said first and second adjustable means, means for correcting errors in the gyro circuit signals, another motor means for positioning said error correcting means at a variable speed, a circuit for controlling energization of said other motor means in response to the compass circuit signals, another circuit for controlling energization of said other motor means, a gyro drift compensating means for varying the speed at which said other motor means positions said error correcting means, and selective means alternately operable for placing said first mentioned control circuit in controlling operation upon adjustment of the selective means in one sense and placing said other control circuit and said gyro drift compensating means in operative relation upon adjustment of said selective means in another sense.

5. The combination defined by claim 4 in which said gyro drift compensating means includes a disc driven by said other motor means, a cylinder drivingly connected to the error correcting means, a roller drivingly connecting said disc and cylinder, and manually operable means to adjustably position said roller relative to said disc and cylinder to vary the speed at which said other motor means drivingly positions said error correcting means through said disc, roller and cylinder.

6. The combination defined by claim 5 including a separate drive means driven by said other motor means, and a drive shift means controlled by the selective means so as to operatively connect said other motor means to said error correcting means through said separate drive means upon the adjustment of the selective means in said one sense and operatively connect said other motor means to said error correcting means through said gyro drift compensating means upon the adjustment of the selective means in said other sense.

7. A direction indicating system comprising, in combination, a magnetic compass, a compass circuit transmitting directional signals corresponding to the compass position, a directional gyro, a gyro circuit transmitting directional signals corresponding to the gyro position, a direction indicator, motor means for adjusting the direction indicator, gyro drift compensating means, means actuated by the compass circuit signals for correcting errors in the gyro circuit signals, and a manually operable switch including means for placing the compass circuit solely in control of the motor means in one switch position, other means for placing the gyro circuit and the gyro drift compensating means in control of the motor means in another switch position, and additional means for placing the gyro circuit and the error correcting means in control of the motor means in a third adjusted switch position.

References Cited in the file of this patent

UNITED STATES PATENTS

| 2,555,328 | Esval et al. | June 5, 1951 |
| 2,699,612 | Kellogg | Jan. 18, 1955 |
| 2,710,156 | Stone | June 7, 1955 |

FOREIGN PATENTS

| 690,011 | Great Britain | Apr. 8, 1953 |